United States Patent
Hancock et al.

(10) Patent No.: US 6,893,087 B2
(45) Date of Patent: May 17, 2005

(54) ALL TERRAIN VEHICLE SEAT CUSHION

(75) Inventors: Dennis Hancock, Mountain Green, UT (US); Jeffrey D Hancock, Uintah, UT (US)

(73) Assignee: Stearns Inc., Sauk Rapids, MN (US)

( * ) Notice: Subject to any disclaimer, the term of this patent is extended or adjusted under 35 U.S.C. 154(b) by 64 days.

(21) Appl. No.: 10/298,099

(22) Filed: Nov. 18, 2002

(65) Prior Publication Data

US 2004/0095001 A1 May 20, 2004

(51) Int. Cl.$^7$ .............................................. A47C 31/00
(52) U.S. Cl. ............................. 297/219.11; 297/228.12; 297/452.23; 5/653; 5/656
(58) Field of Search ...................... 297/219.11, 219.1, 297/288.1, 452.23, 452.25, 452.26, 228.12; 5/653, 654, 656, 657, 655.9

(56) References Cited

U.S. PATENT DOCUMENTS

| | | | | | |
|---|---|---|---|---|---|
| 1,882,169 A | * | 10/1932 | Wedler | .................. | 297/228.12 |
| 3,078,101 A | * | 2/1963 | Reese | ........................... | 280/30 |
| 3,112,956 A | * | 12/1963 | Schick et al. | ............ | 297/219.1 |
| 3,222,694 A | * | 12/1965 | Schick | ........................... | 5/653 |
| 4,370,767 A | * | 2/1983 | Fraser | ........................... | 5/417 |
| 4,416,462 A | * | 11/1983 | Thompson | ............. | 280/33.993 |
| 4,852,362 A | * | 8/1989 | Conry | .......................... | 62/175 |
| 4,912,788 A | * | 4/1990 | Lonardo | ........................ | 5/653 |
| 4,945,591 A | * | 8/1990 | Inagaki | ..................... | 297/219.1 |
| 4,953,913 A | * | 9/1990 | Graebe | ................... | 297/452.25 |
| 5,275,315 A | * | 1/1994 | Carmack et al. | ............ | 224/576 |
| 5,275,463 A | * | 1/1994 | Rocha | ........................ | 297/229 |
| 5,326,152 A | * | 7/1994 | Baron | ........................ | 297/229 |
| 5,352,023 A | * | 10/1994 | Jay et al. | ............... | 297/452.21 |
| 5,624,157 A | * | 4/1997 | Kostuk | .................. | 297/228.13 |
| 5,785,427 A | * | 7/1998 | Godshaw | ........................ | 383/4 |
| 6,256,819 B1 | * | 7/2001 | Maier et al. | .................. | 5/653 |

* cited by examiner

Primary Examiner—Peter M. Cuomo
Assistant Examiner—Stephanie Harris
(74) Attorney, Agent, or Firm—Merchant & Gould P.C.

(57) ABSTRACT

A seat cushion for use on all terrain vehicles and snowmobiles made of a single piece of molded foam having a skin covering a foam core, a front portion with a curved leading edge to fit against a gas tank filler spout, outer edges hinged to bend over a vehicle seat, straps connected to the outer edges to secure the cushion to a vehicle frame or housing and an air circulating and water drainage system formed on central areas of the cushion and with foam cushion areas formed between grooves of the air circulating and water drainage system to support the bones of the buttocks of a user seated on the cushion.

2 Claims, 5 Drawing Sheets

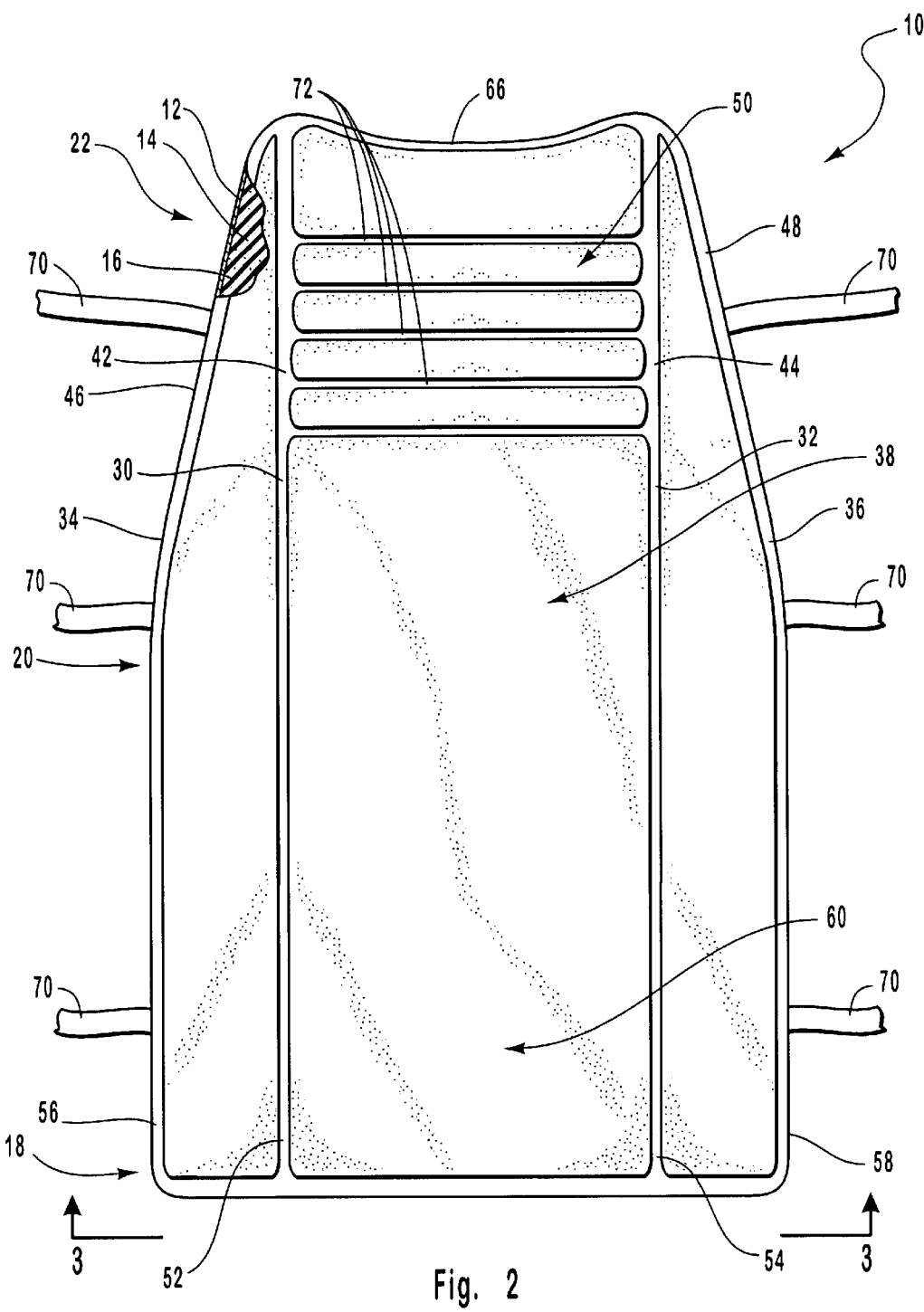
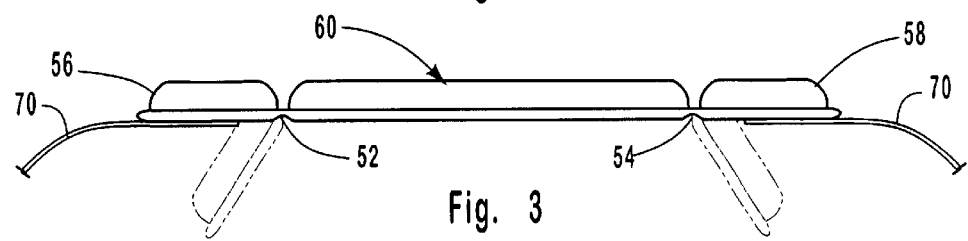

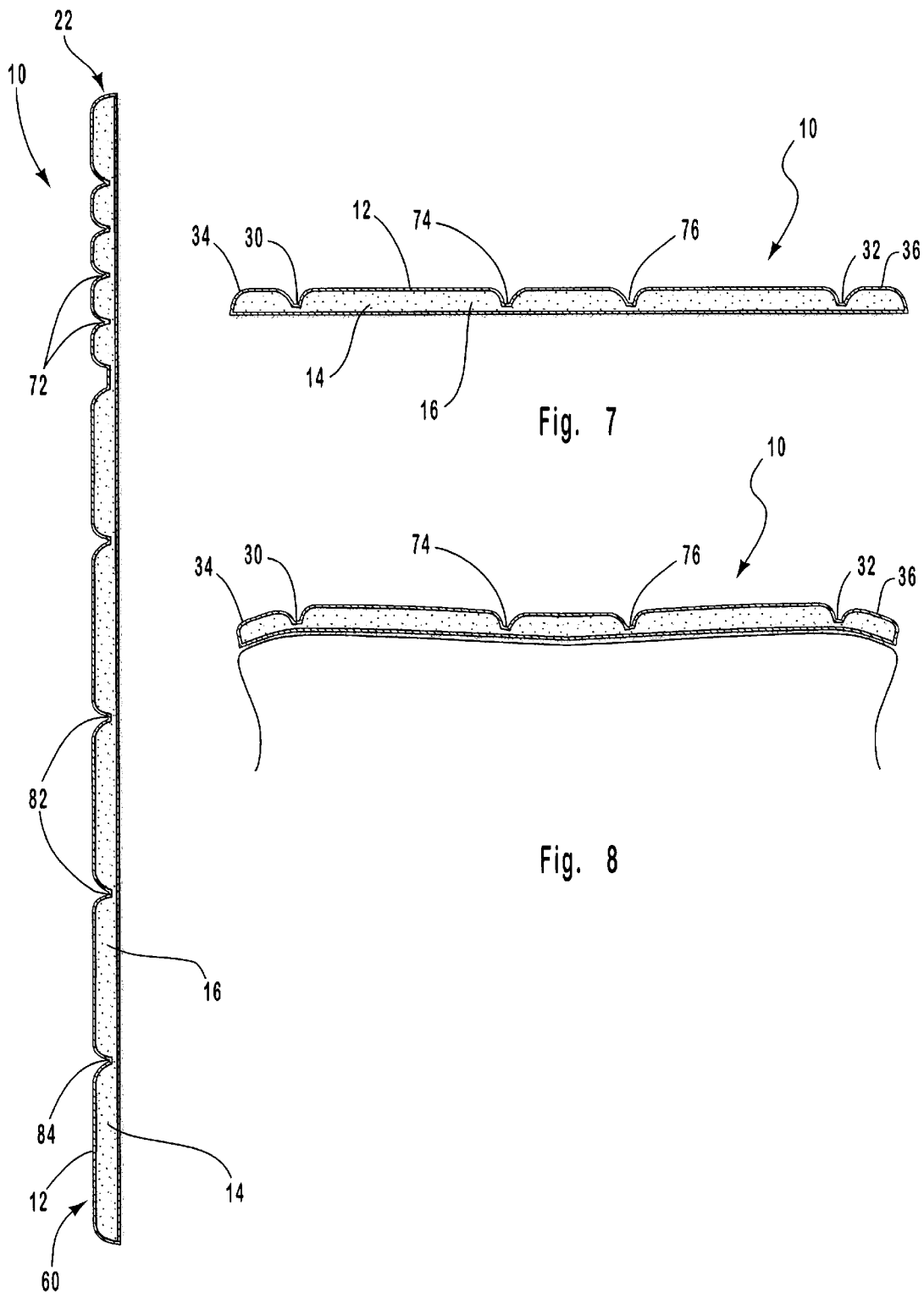

ALL TERRAIN VEHICLE SEAT CUSHION

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

This invention relates to seat cushions particularly useful for all terrain vehicles.

DESCRIPTION OF THE RELATED ART

All terrain vehicles (ATV's) frequently come equipped with plastic covered, foam cushioned seats. After continued exposure to the elements, i.e. sun, rain and snow, the plastic materials making up the seat covers crack, tear and generally just disintegrate. This disintegration is at least partially due to water collecting on the seats and freezing of the water. Once a crack develops in the cover, water will seep through to collect in the foam of the seat where it will cause even more damage. Replacement of the original seats is undesirably expensive and replacement of original seats with other seats of the same type merely positions other seats to deteriorate in the same fashion as the original seats.

Objects of the Invention

Principal objects of the present invention are to provide s seat cushion that will overlie and protect the original seat of an ATV or snowmobile from the damaging effects of sun, rain and snow, while at the same time providing a more comfortable ride for users of the vehicle. Still other objects are to provide a seat cushion that increase the cushioning provided for a user of the vehicle and to provide a cushion that is relatively inexpensive, as compared to replacement costs for original seats, while having features to prevent the collection of water and snow on the cushion.

Features of the Invention

Principal features of the invention include a one piece molded construction of the seat cushion from a foam material developing a skin when the seat cushion is pressed into shape. Opposite sides of the seat cushion are hinged to fit on top of an original seat or to bend over the edges of such original seat, as may be desired. A central corrugated portion at a front of the seat cushion permits upward bending of the center front potion between the spaced apart hinged sides to better fit over original seats having an upwardly tilted portion at a front end. The front end of the cushion is curved to allow the cushion to fit against a filler cap of a gas tank of a vehicle. Parallel grooves in the upper face of the seat cushion extend from the corrugations to a rear pad formed at the rear end of the cushion and transverse parallel grooves extend across the seat cushion between the corrugations and the rear pad of the seat. A pair of parallel grooves extend across the rear pad to allow water collected in the transverse parallel grooves to flow off the cushion.

Additional objects and features of the invention will become apparent from the drawings, detailed description and claims hereafter set forth.

BRIEF DESCRIPTION OF THE FIGURES OF THE DRAWINGS

In the drawings:

FIG. 2, a top plan view;

FIG. 3, an end view taken on the line 3–3 of FIG. 2;

FIG. 6, an elongate section taken on line 6—6 of FIG. 5, through the center of the seat cushion;

FIG. 7, a transverse section taken on the line 7—7 of FIG. 5; and FIG. 8, a view like that of FIG. 7, but showing edges of the cushion folded over edges of a vehicle seat (shown fragmentarily).

DETAILED DESCRIPTION

Figure 1:
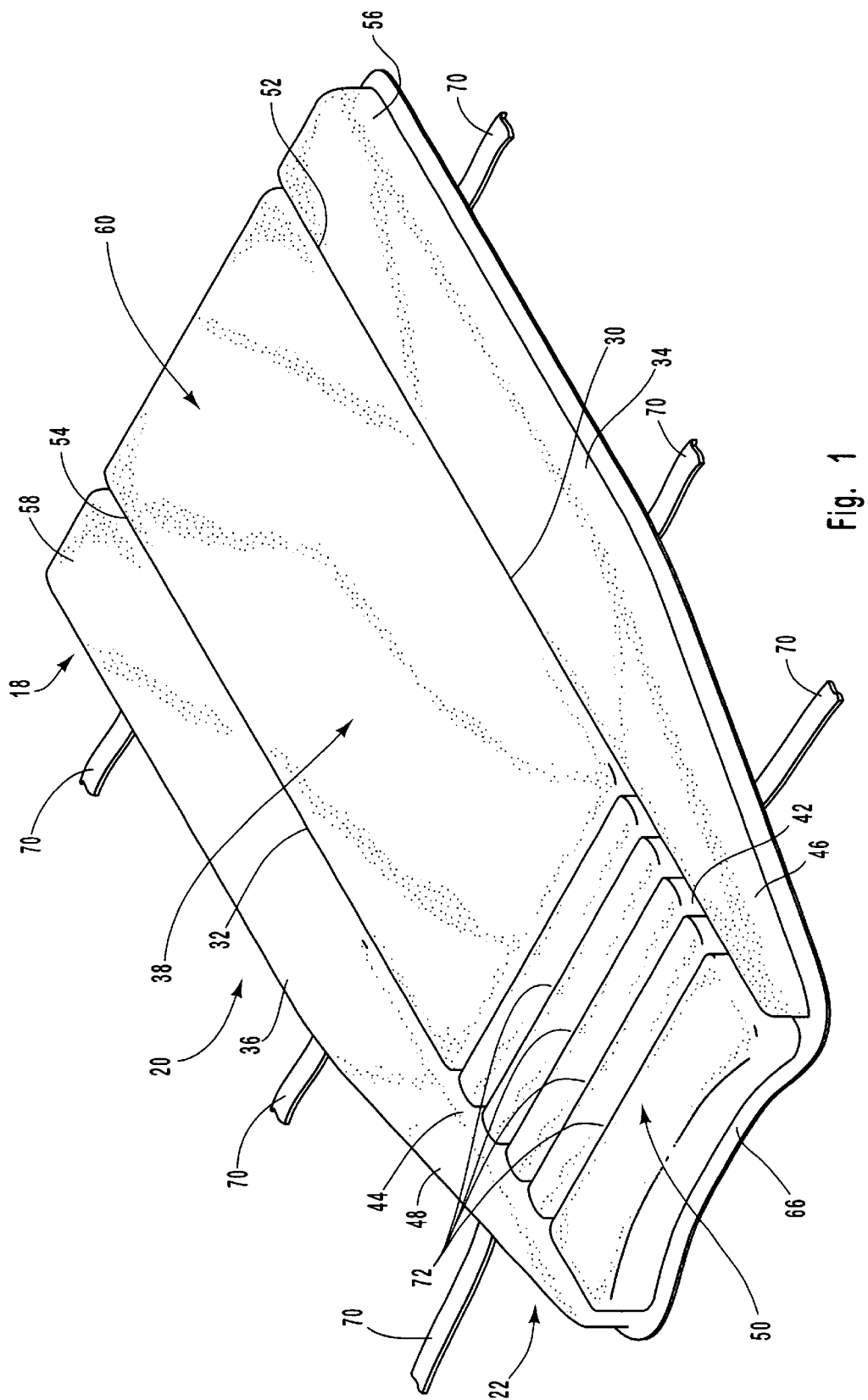
FIG. 1 is a perspective view of the seat cushion of the present invention.
Figure 4:
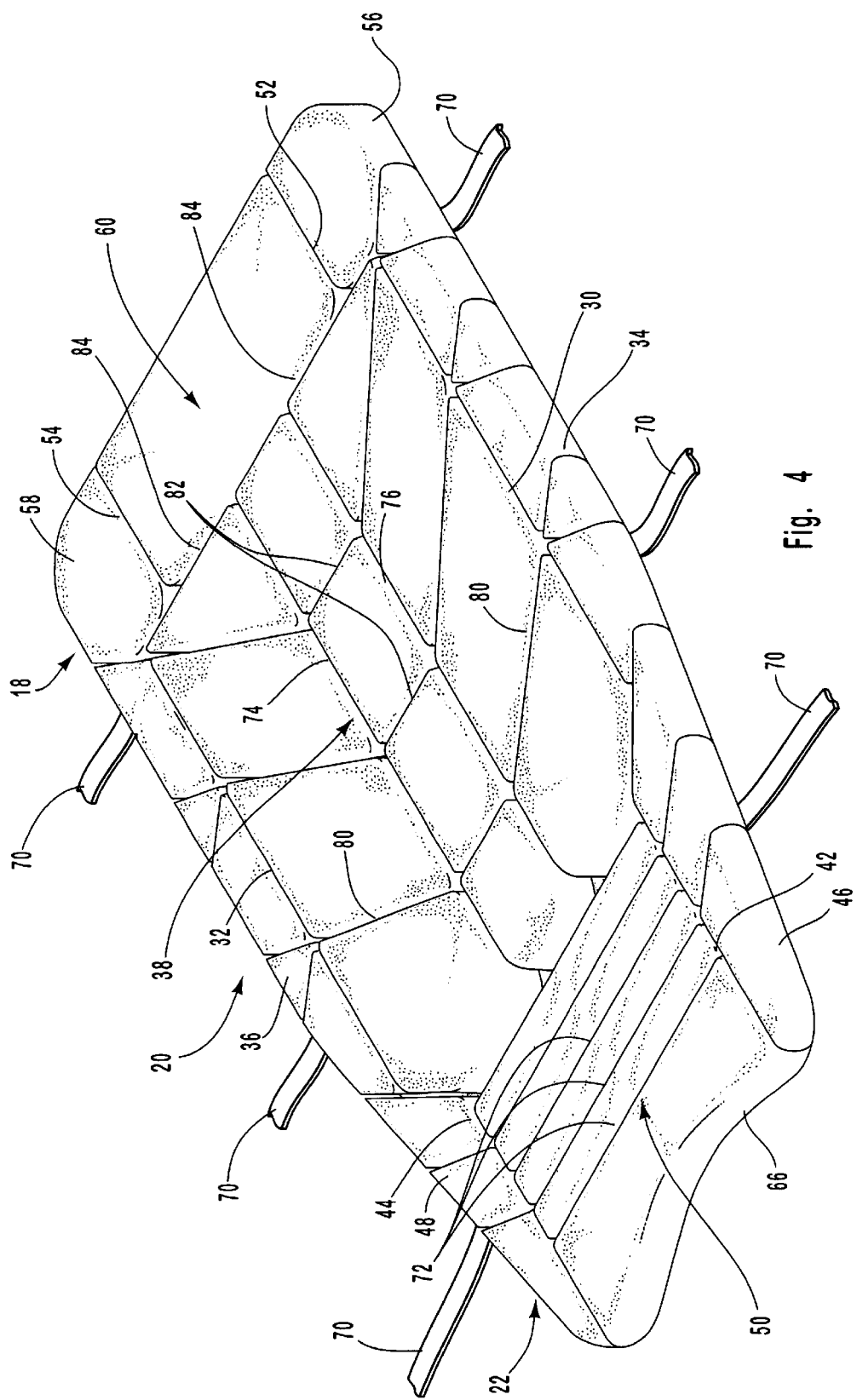
FIG. 4, a view like that of FIG. 1, but showing grooves in the cushion for air and waterflow.
Figure 5:
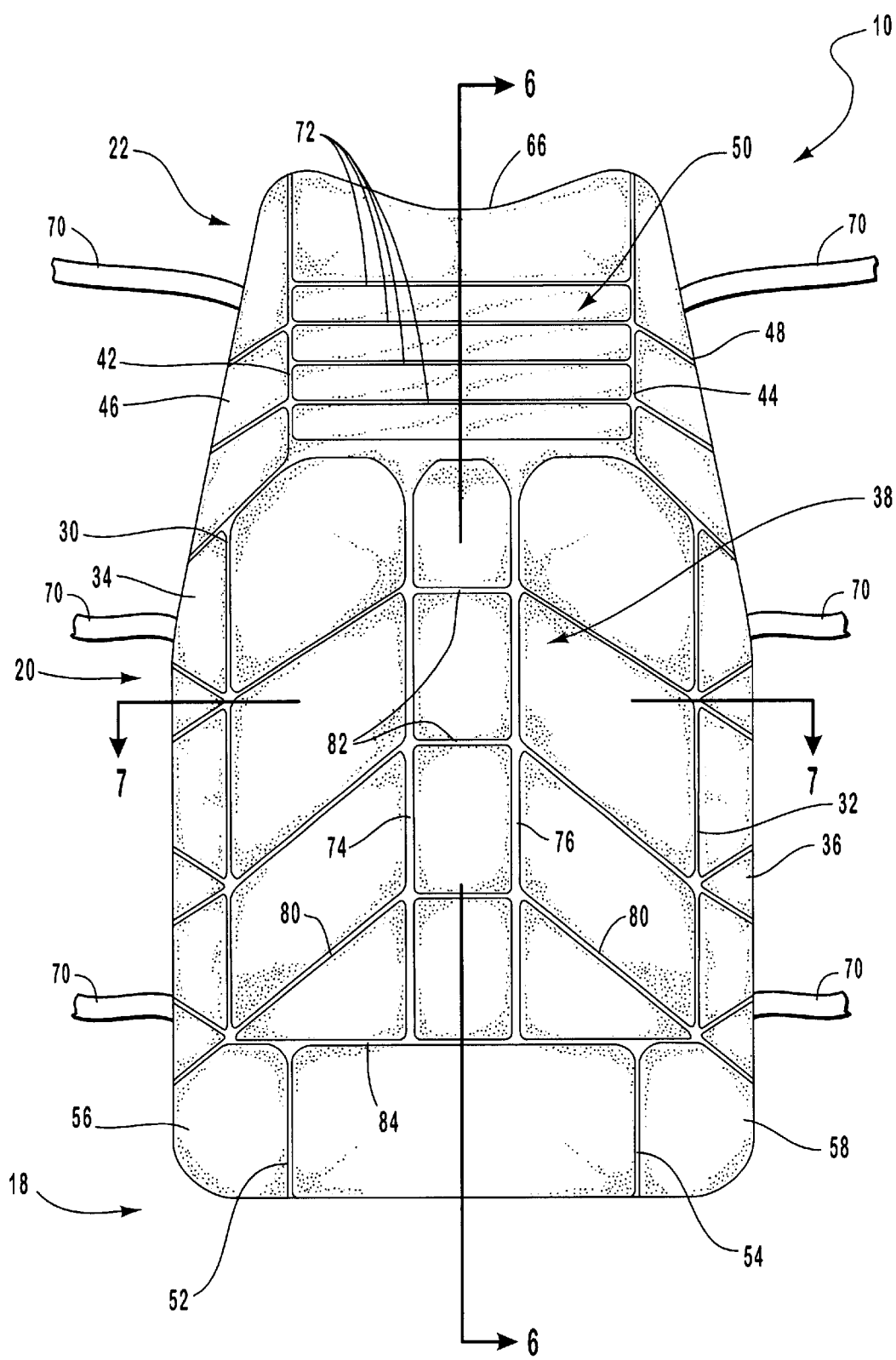
FIG. 5, a top plan view of the seat cushion as shown in FIG. 4.

Referring now to the drawings:

In the illustrated preferred embodiment, the seat cushion of the invention is shown generally at 10.

The seat cushion 10 is made of a single piece of pressed and molded material and when pressed and molded has an outer skin 12 surrounding a core 14 of resilient foam material 16. Seat cushion 10 is of generally rectangular configuration and is formed with a rear end piece 18, a central portion 20 and a front piece 22. While generally rectangular, the seat cushion may be tapered slightly at the front piece 22 and may have slightly curved outer edges to enable the cushion to better overlay a seat of an ATV vehicle or as snowmobile.

The central portion 20 has a pair of hinges 30 and 32 pressed there into to form opposite sides 34 and 36 that will flex relative to a center area 38. The front piece 22 similarly has a pair of spaced apart hinges 42 and 44 pressed there into to form opposite sides 46 and 48 that will flex relative to a center area 50. The rear end piece 18 has a pair of spaced apart hinges 52 and 54 interconnecting opposite sides 56 and 58 with a center area 60. The hinges of the central portion may connect to the hinges of the front piece 22 and the rear piece 18.

Front piece 22 has a leading edge 66 that is curved to allow the front piece to fit around a gas can filler spout and gas cap of a vehicle.

A strap 70 is preferably attached to each of the sides 34, 36, 46, 48 and 56 58 and will serves as a means for securing the seat cushion 10 in place overlying the seat of an ATV or snowmobile. The straps are merely secured to any available frame or housing component of the vehicle.

Corrugations 72, extend across the center area 50 of the central portion 20 of the front piece 22, between the hinges 42 and 44. The corrugations allow the front piece to flex in conformity with the upwardly curved portion of a vehicle seat, should the vehicle be equipped with a seat having such a curved front end.

The outer sides of the front piece 22, central portion 20 and rear piece 18 may be interconnected, as shown or they may be separated. In any event, when the seat cushion 10 is positioned to overlay a vehicle seat the outer sides protect the sides of the seat.

Water falling onto the seat cushion 10 is directed into a pair of parallel grooves 74 and 76 that extend through the central areas of the central front and rear pieces of the cushion, The collected water then flows from the central areas through spaced apart transverse grooves 80 connecting the grooves 74 and 76 with the hinges 36 and 38. The water will then flow along the hinges 36 and 38 if the side panels are not bent over sides of a vehicle seat or past the hinges and off the seat cushion 10. When no water is present, the grooves allow air flow therethrough, Such air flow provides comfort to the buttocks of a user. Likewise, the foam filled portions on opposite sides of the grooves 74 and 76 are positioned beneath the bones in the buttocks of a user and provide additional cushioning to the original seat and additional comfort to the user.

Spaced apart grooves 82 extending across a central portion 20 interconnect the grooves 74 and 76 to allow water collecting in the central portion to be discharged to the grooves 74 and 76. The grooves 82 also provide for airflow.

Grooves 84 further allow flow of collecting water from the central portion 20 to the hinges 32 and 34 and then off the seat cushion 10. Grooves 84 also help provide airflow across the cushion 10.

As noted, when foam core 16 of a seat cushion 10, is positioned to overlie a seat of an ATV or snowmobile extra cushioning and therefore additional comfort is provided for a rider of the vehicle. In addition, the low-cost seat cushion 10 will prevent wear and weathering effects on the vehicle seat, thereby saving the cost of using much more expensive replacement seats.

Although a preferred form of our invention has been herein disclosed, it is to be understood that the present disclosure is by way of example and that variations are possible without departing from the subject matter coming within the scope of the following claims, which subject matter we regard as our invention.

We claim:
1. A seat cushion for use with all terrain vehicles and snowmobiles comprising
   a molded cushion made of a single piece of moldable plastic material and having an outer skin and an inner foam plastic core and a top surface providing a sitting surface for a user and interconnected central, front and rear portions;
   a hinge to provide bending downward from said top surface, at each of two opposing sides and extending the length of the cushion;
   an outer edge of said cushion extending outwardly of each said hinge and for the length of the hinge to bend downwardly at said hinge, away from said sitting surface and relative to the portion of said cushion between said hinges;
   strap means fixed to and projecting from each outer edge of said cushion; and wherein
      the front portion has a leading edge curved inwardly towards said central portion and from side-to-side of said molded cushion and corrugations extending across a center area between the hinges to collect water and to direct such water to said hinges for discharge from said seat cushion.
2. A seat cushion as in claim 1 further including
   a pair of first spaced apart grooves extending through the central areas of the cushion between front and rear portions and transversely spaced apart grooves extending between said first spaced apart grooves;
   matching grooves outside of said central area connecting each of said transversely spaced grooves to a hinge; and
   additional spaced apart grooves having one end opening to a groove extending between the hinges and extending across said rear portion.

* * * * *